Dec. 6, 1966 C. VAN DER LELY 3,289,382
METHOD OF BUILDING UP BUILDINGS FROM PREFABRICATED
BOX-SHAPED ELEMENTS
Filed Jan. 26, 1962 13 Sheets-Sheet 1

INVENTOR.
CORNELIS VAN DER LELY
BY
Mason, Mason & Albright
Attorneys

Dec. 6, 1966 C. VAN DER LELY 3,289,382
METHOD OF BUILDING UP BUILDINGS FROM PREFABRICATED
BOX-SHAPED ELEMENTS
Filed Jan. 26, 1962 13 Sheets-Sheet 2
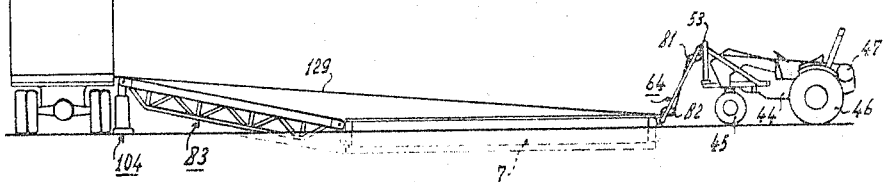
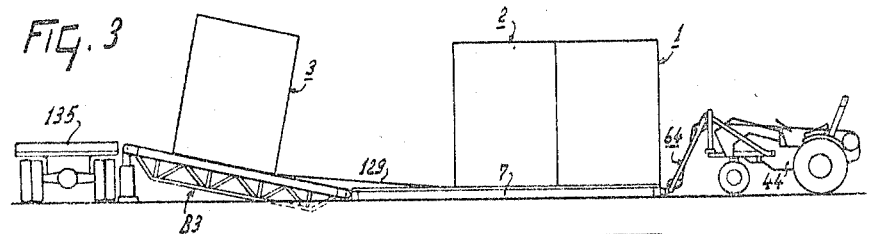
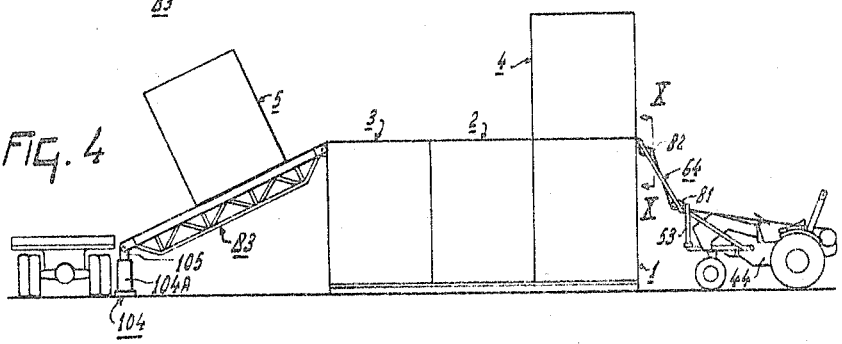
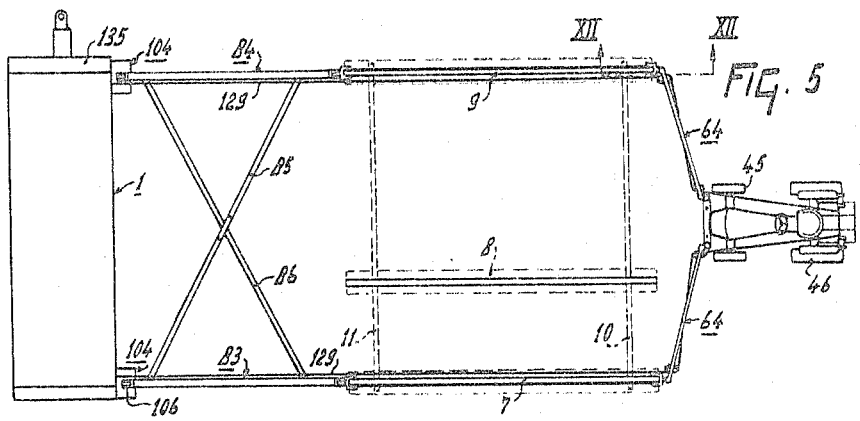
INVENTOR.
CORNELIS VAN DER LELY
BY
Mason, Mason & Albright
Attorneys

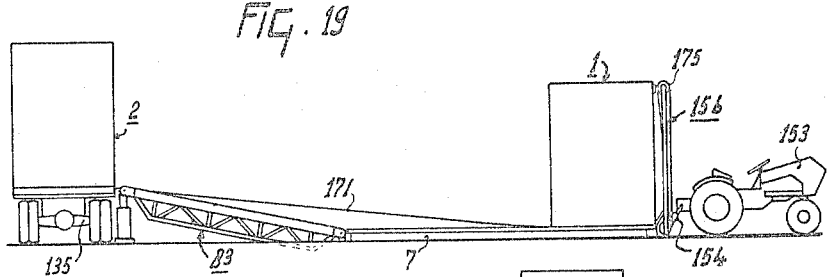
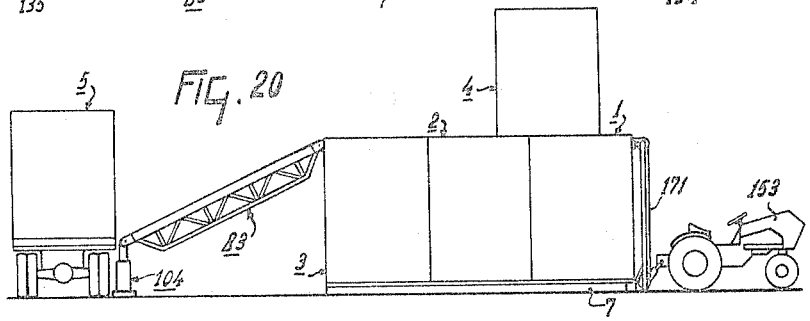
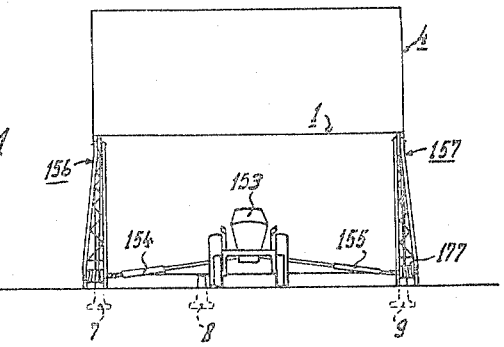

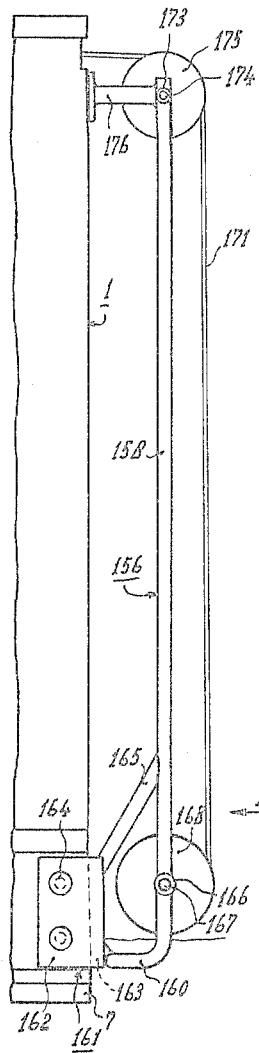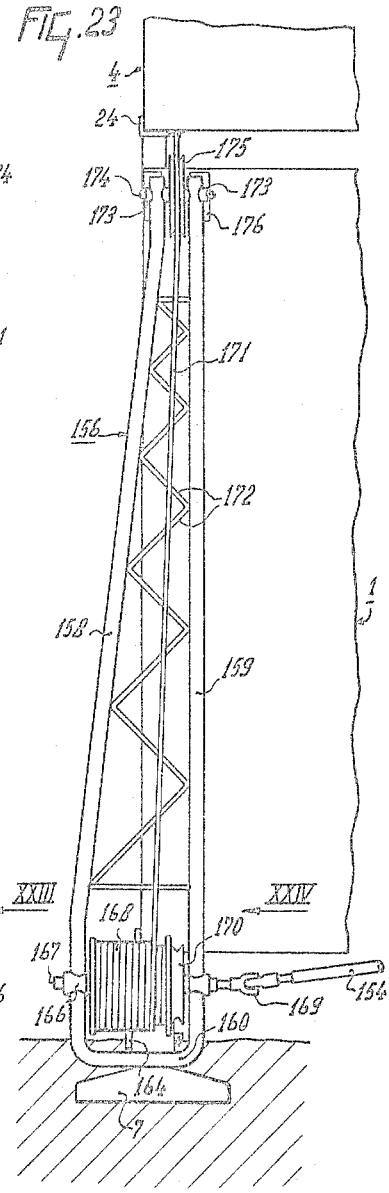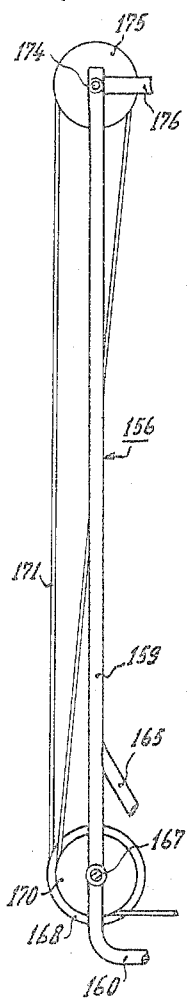

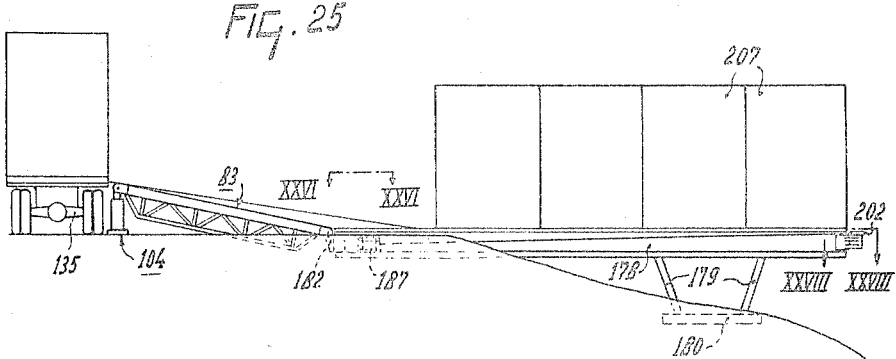
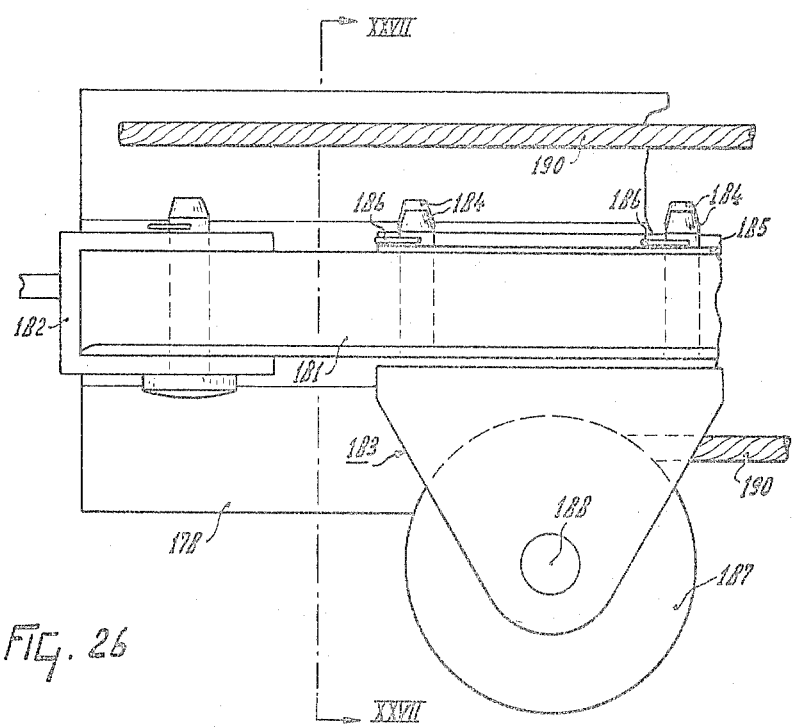

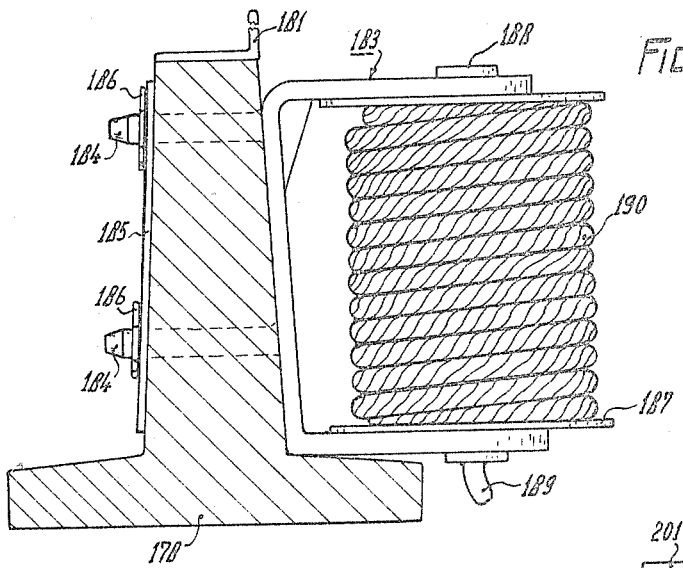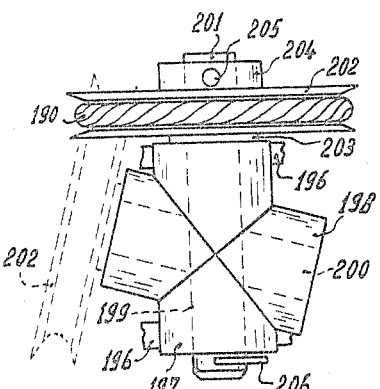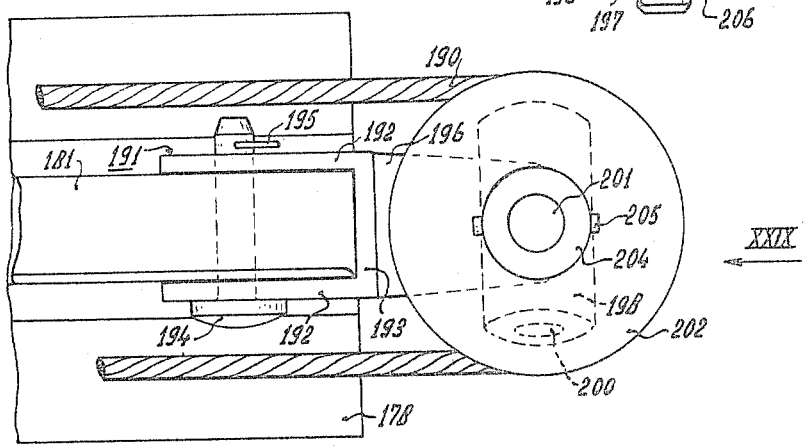

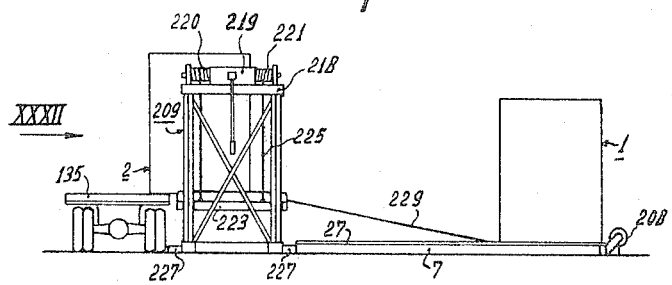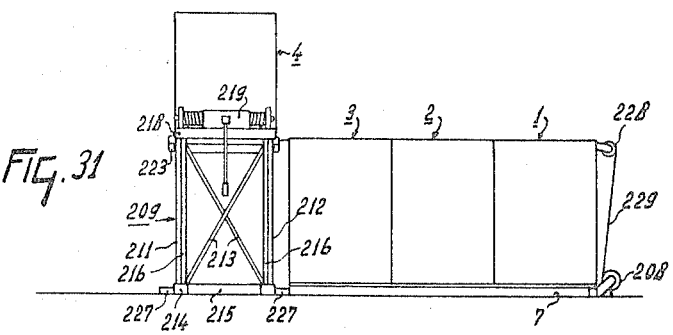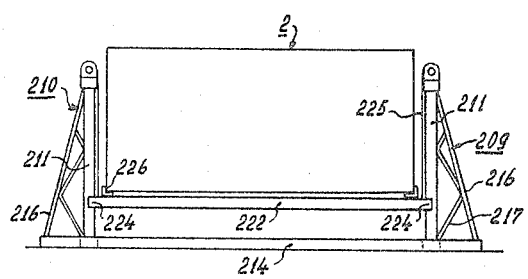

United States Patent Office 3,289,382
Patented Dec. 6, 1966

3,289,382
METHOD OF BUILDING UP BUILDINGS FROM PREFABRICATED BOX-SHAPED ELEMENTS
Cornelis van der Lely, Zug, Switzerland, assignor to Patent Concern N.V., Willemstad, Curacao, Netherlands Antilles, a limited-liability company of the Netherlands Antilles
Filed Jan. 26, 1962, Ser. No. 169,031
Claims priority, application Netherlands, Feb. 3, 1961, 260,866
4 Claims. (Cl. 52—741)

The invention relates to a method of building up buildings from prefabricated box-shaped elements, each comprising at least part of a story.

In accordance with the invention the elements are shifted to their places, after having been discharged from a transporting vehicle, with the aid of mechanical expedients. This shifting of the elements permits the employment of simple, mechanical expedients for their correct disposition, which means can be readily displaced. Thus, as compared with the expenses involved in conventional construction methods, the building costs can be considerably reduced.

For a better understanding of the invention and to show how the same may be carried into effect, reference will now be made to the accompanying drawing, in which:

FIGS. 2 to 5 show different phases of the assembly of the building.

FIGS. 19 to 21 show diagrammatically different phases of the assembly of a building, use being made of expedients differing from those shown in FIGS. 2 to 5.

FIG. 22 shows on an enlarged scale the fastening of winches to the building.

FIG. 23 is an elevation of the fastening shown in FIG. 22, viewed in the direction of the arrow XXIII.

FIG. 24 is an elevation of the fastening shown in FIG. 23, viewed in the direction of the arrow XXIV.

FIG. 25 shows diagrammatically the assembly of a building with the aid of winches fastened to the foundation.

FIG. 26 shows on an enlarged scale the fastening of a winch to a foundation beam, taken on the line XXVI—XXVI in FIG. 25.

FIG. 27 shows a sectional view of the fastening means of FIG. 26 taken on the line XXVII—XXVII.

FIG. 28 shows the fastening of a pulley to a foundation beam, taken on the line XXVIII—XXVIII in FIG. 25.

FIG. 29 is an elevation of the pulley of FIG. 28, viewed in the direction of the arrow XXIX.

FIGS. 30 and 31 show different phases of the assembly of a building, use being made of a lifting bridge.

FIG. 32 is an elevation of the lifting bridge in the direction of the arrow XXXII in FIG. 30, the element being completely shifted onto the lifting birdge and the transport vehicle being removed.

Figure 1:
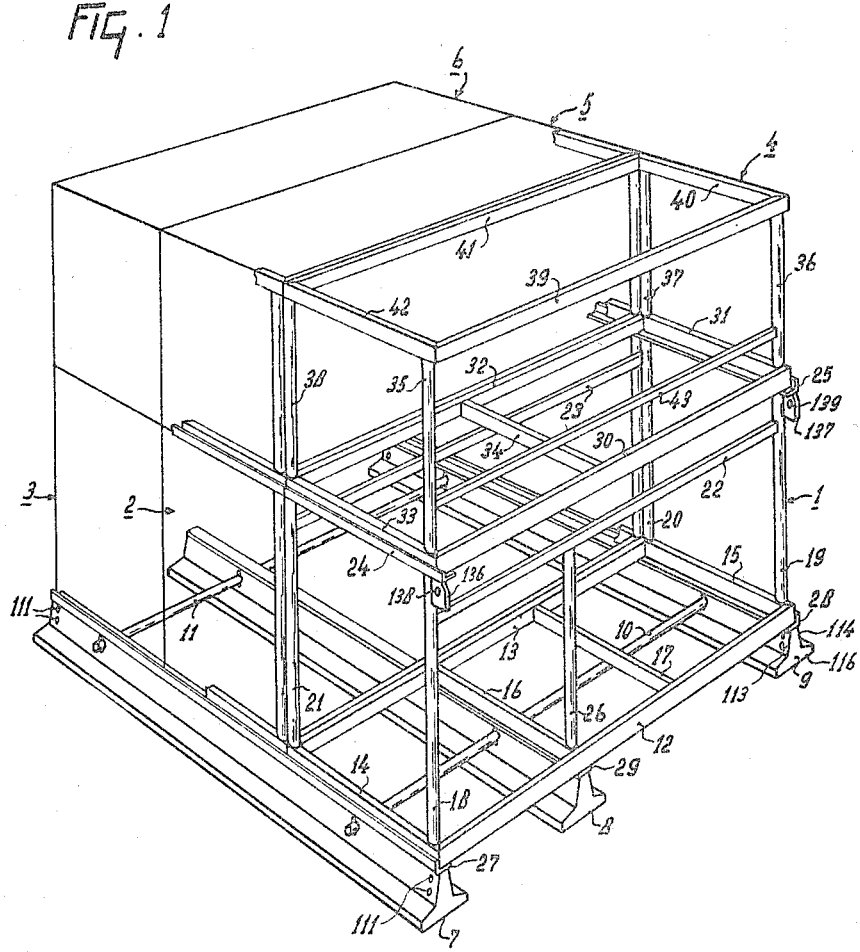
FIG. 1 shows diagrammatically a building constructed by carrying out the method according to the invention.

The building shown diagrammatically in FIG. 1 comprises two layers of three elements. The elements 1, 2 and 3 constitute the lower story and the elements 4, 5 and 6 constitute the top story. The elements 1 to 3 of the lower story bear on foundation beams 7, 8 and 9, which are connected with each other by coupling bars 10 and 11, which extend at right angles to the foundation beams.

The elements of the house are prefabricated and comprise each a frame of beams, which constitutes the supporting structure of the element and to which inter alia the inner and outer walls, the ceilings and the floors are secured.

The frame of the element 1 has on the lower side a rectangle of the beams 12, 13, 14 and 15. The beams 12 and 13 constitute the long sides of the box-shaped element 1 and have a length approximately two-and-a-half times the length of the beams 14 and 15, which constitute the short sides of the rectangle. Between the beams 12 and 13 are provided stiffening girders 16 and 17, which extend parallel to the beams 14 and 15. At the corners of the rectangular frame formed by the beams 12 to 15 are arranged vertical beams formed by tubes 18, 19, 20 and 21. Between the beams 18 and 19 provision is made of a beam 22, which is parallel to the beam 12 and which is located at a given distance from the ends of the beams 18 and 19. In a similar manner the beams 20 and 21 have arranged between them a beam 23, which is parallel to the beam 13 and is located at a given distance from the ends of the beams 20 and 21.

The ends of the beams 18 and 21 are connected with each other by a beam 24, formed by an angle iron, extending parallel to the beam 14 and bearing on the beams 18 and 21.

The ends of the beams 19 and 20 are connected with each other by a beam 25, formed by an angle iron, extending parallel to the beam 15 and bearing on the beams 19 and 20.

Between the beams 12 and 22 provision is made of a beam 26, formed by a tube.

The elements 2 and 3 are constructed mainly in the same manner as the element 1, described above, and are therefore shown only in part.

The elements 1 to 3 of the lower floor bear on the foundation beams 7 to 9.

From the figure it will be seen that the foundation beams 7 and 9 have arranged on them beams 27 and 28, formed by angle irons and the foundation beam 8 is provided with a strip 29. The beams 14 and 15 of the element 1 bear on the angle irons 27 and 28 respectively, whereas the beam 16 bears on the strip 29. The box-shaped element 1 is therefore enclosed between the vertical legs of the angle irons 27 and 28, so that the element cannot shift transversely with respect to the foundation beams.

The frame of the element 4, located above the element 1, has a rectangle of beams 30, 31, 32 and 33, on the lower side. The beams 30 and 32 constitute the long sides of the rectangular frame, whereas the beams 31 and 33 constitute the short sides of this frame. Not only by the beams 31 and 33, but also by a beam 34 the beams 30 and 32 are connected with each other, the beam 34 extending parallel to the beams 31 and 33. At the corners of the rectangle formed by the beams 30 to 33 provision is made of vertical beams 35, 36, 37 and 38, formed by tubes. On the ends of these tubes bears a rectangular frame of beams 39, 40, 41 and 42, of which the beams 39 and 41 constitute the long sides of this rectangular frame and extend parallel to the beams 30 and 32. The tubes 35 and 36 are connected with each other by a frame beam 43, which is parallel to the beam 30.

From the figure it appears that the box-shaped element 4 bears with the beams 31 and 33 on the angle irons 24 and 25 on the top side of the element 1, so that the element is enclosed between the vertical limbs of the angle irons and is secured against displacement in a direction parallel to the long sides of the rectangle of the element. The elements 5 and 6 correspond at least mainly with the element 4 and are shown only partly in the figure.

When an element is disposed at its place in the building, it is connected by means of bolts with the adjacent elements or with the foundation or with both.

The method of assembling a building to be described hereinafter, may be carried out not only with elements provided with the inner and outer walls, the ceilings, the floors and the like already prior to the assembly of the building on the frame of the element, but also with elements with which the aforesaid parts are arranged wholly or partly subsequent to mounting of the elements at their places in the building.

In accordance with the invention the elements are shifted to their places in the building from the vehicle by which they are transported to the site by means of mechanical expedients. This may be carried out, for example, by employing a bridge and a tractor, which can be coupled not only with the foundation beams of the building but also with the top sides of the elements of the lower story (FIGS. 2 to 5).

Figure 6:
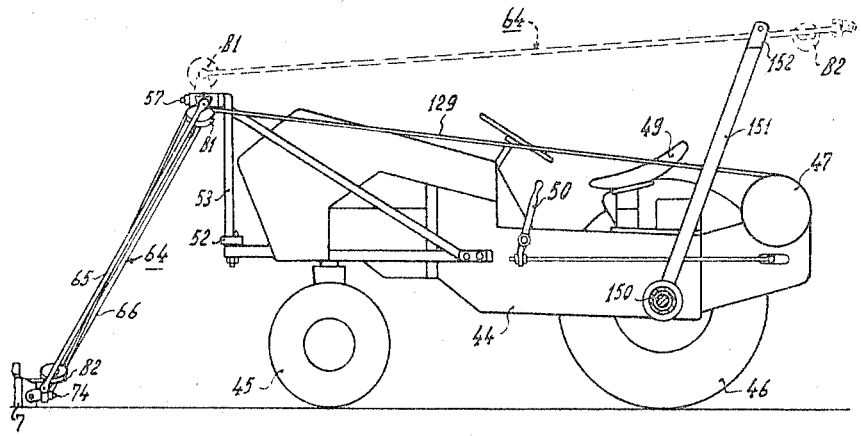
FIG. 6 shows one embodiment of a tractor suitable for use in assembling the buildings.
Figure 7:
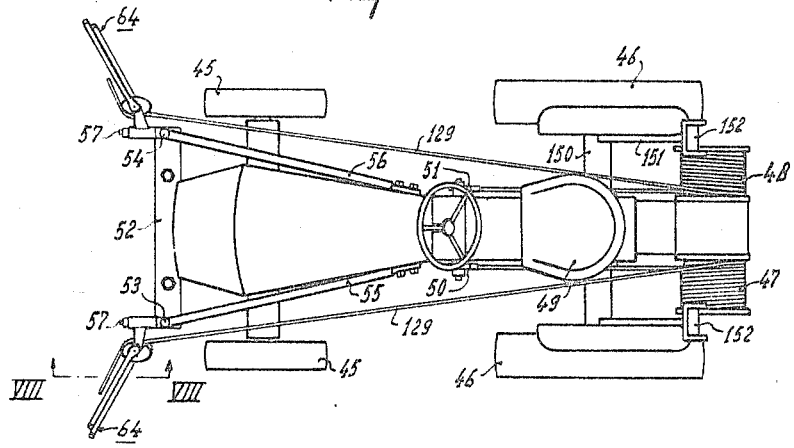
FIG. 7 shows a plan view of the tractor of FIG. 6.

The tractor employed to this end is shown in detail in FIGS. 6 and 7. The tractor comprises a frame 44, which is supported from steerable ground wheels 45 and driven wheels 46. On the rear side of the tractor are mounted two winches 47 and 48, which can be driven from the power-take-off shaft of the tractor.

The winches can be actuated independently of each other by means of control-members 50 and 51, located near the seat. On the front side of the tractor provision is made of a mounting beam, provided with vertical beams 53 and 54. Near their free ends the beams 53 and 54 have secured to them the ends of struts 55 and 56, which extend from their fastening points to the beams 53 and 54 obliquely rearwards, whereas their other ends are secured to the chassis of the tractor.

Figure 8:
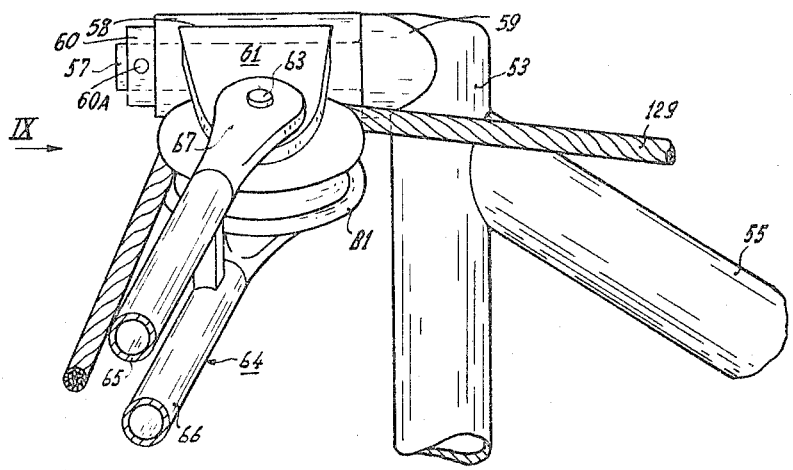
FIG. 8 shows on an enlarged scale the connection of a coupling member with the tractor taken on the line VIII—VIII in FIG. 7.
Figure 9:
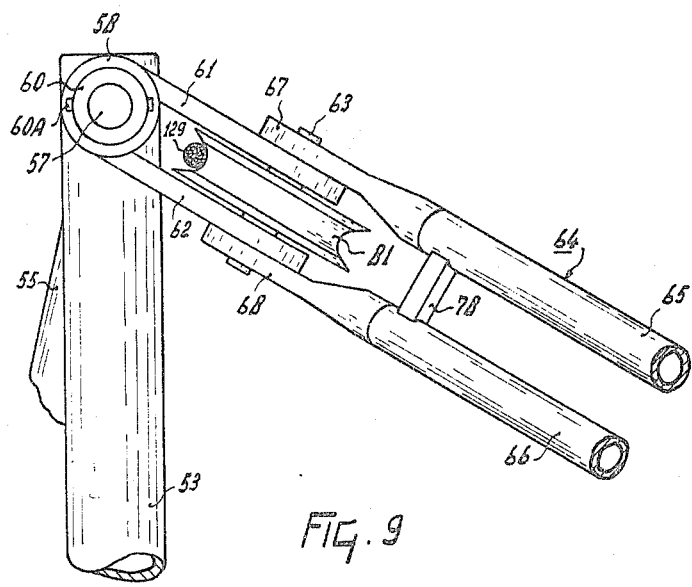
FIG. 9 is an elevation of the connection of FIG. 8, in the direction of the arrow IX.

To the ends of the beams 53 and 54 are secured horizontal shafts 57, extending parallel to the longitudinal axis of the tractor (FIGS. 8 and 9). A bearing 58 is freely rotatable about the shaft 57. This bearing 58 is enclosed between a shoulder 59, secured to the beam 53 and a ring 60, slipped onto the shaft 57 and secured thereto by means of a pin 60A. The bearing 58 is provided with two ears 61 and 62. These ears are provided with holes for accommodating a shaft 63, which crosses the shaft 57 at right angles. With the aid of the shaft 63 a coupling member 64 is pivoted to the bearing 58. The coupling member comprises two beams formed by hollow pipes 65 and 66, to the ends of which plates 67 and 68 are secured. The plates 67 and 68 are provided with holes, in which the shaft 63 is journaled.

Figure 11:
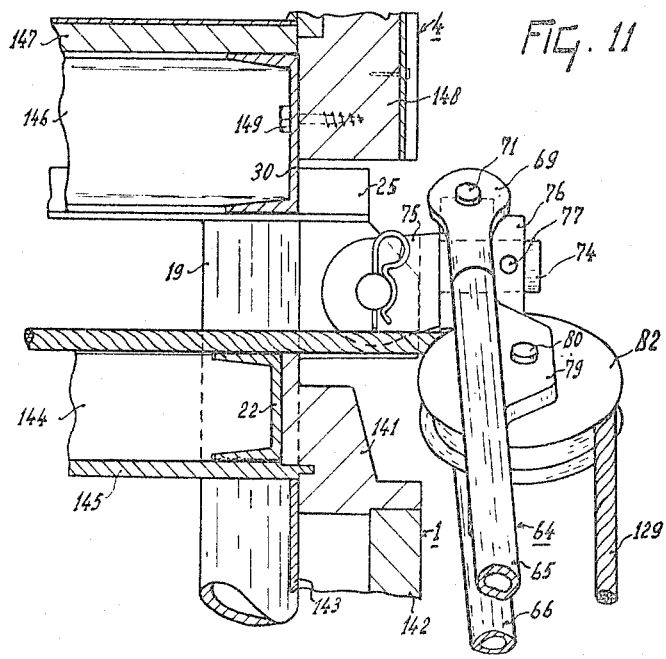
FIG. 11 is an elevation of the connection of FIG. 10, viewed in the direction of the arrow XI.
Figure 10:
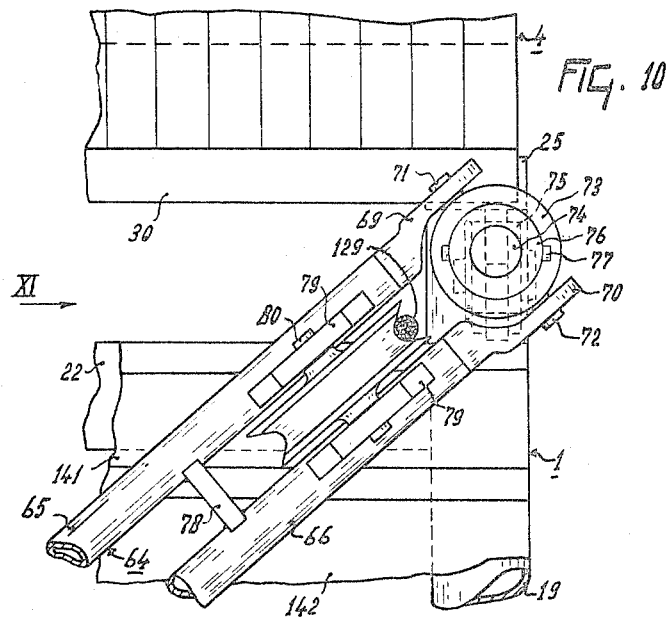
FIG. 10 shows the connection of the coupling member with the top side of a lower element of the building, taken on the line X—X in FIG. 4.
Figure 12:
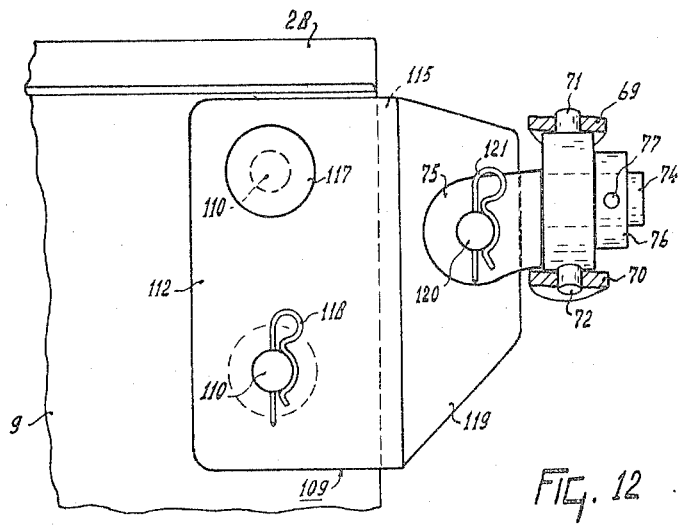
FIG. 12 shows the connection of the coupling member with a foundation beam, taken on the line XII—XII in FIG. 5.

To the other ends of the pipes are secured plates 69 and 70. Also the plates 69 and 70 are provided with holes (FIGS. 10 to 12).

In the holes provided in the plates 69 and 70, pins 71 and 72 are provided which are secured to a ring 73. The ring 73 is freely rotatable about a shaft 74, which is secured to a U-shaped bracket 75. The ring 73 is enclosed between the bracket 75 and a ring 76, which is secured to the shaft 74 by means of a pin 77. From the figures it will furthermore be seen that the pipes 65 and 66 are connected with each other by supports 78. Near the plates 69 and 70 provision is made of ears 79. These ears are provided with holes for accommodating a shaft 80, extending at right angles to the longitudinal direction of the pipes and parallel to the shaft 63.

Between the ends of the pipes are provided two pulleys 81 and 82. The pulley 81 is freely rotatable about the shaft 63 and the pulley 82 is freely rotatable about the shaft 80.

The bridge used in this embodiment of the method according to the invention comprises two parts 83 and 84, which are connected with each other by coupling bars 85 and 86 (FIGS. 2 to 5).

Figure 14:
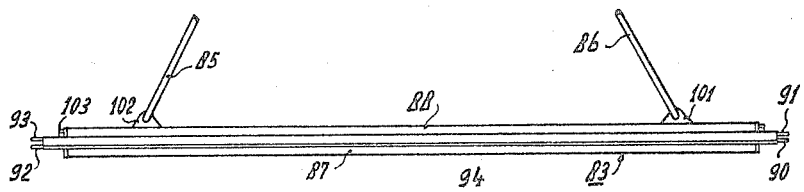
FIG. 14 is a plan view of the bridge shown in FIG. 13.
Figure 13:
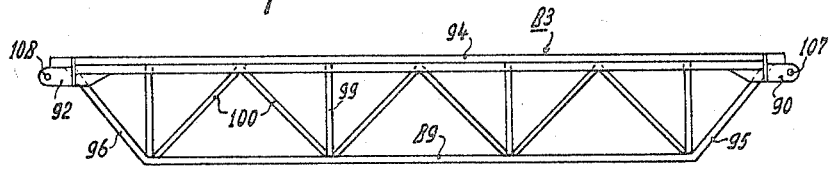
FIG. 13 is a side elevation of a bridge part of the bridge shown in FIGS. 2 to 5.
Figure 15:
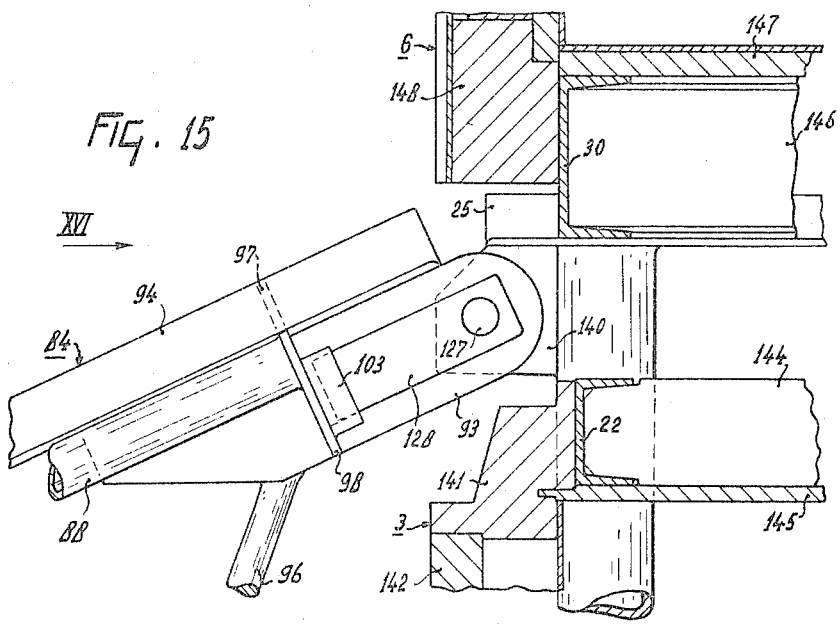
FIG. 15 shows the coupling of a bridge part with the top side of an element.
Figure 16:
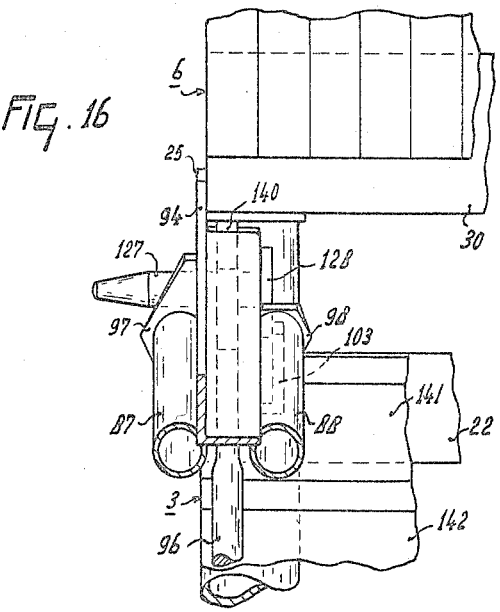
FIG. 16 is an elevation of the coupling of FIG. 15, viewed in the direction of the arrow XVI.
Figure 17:
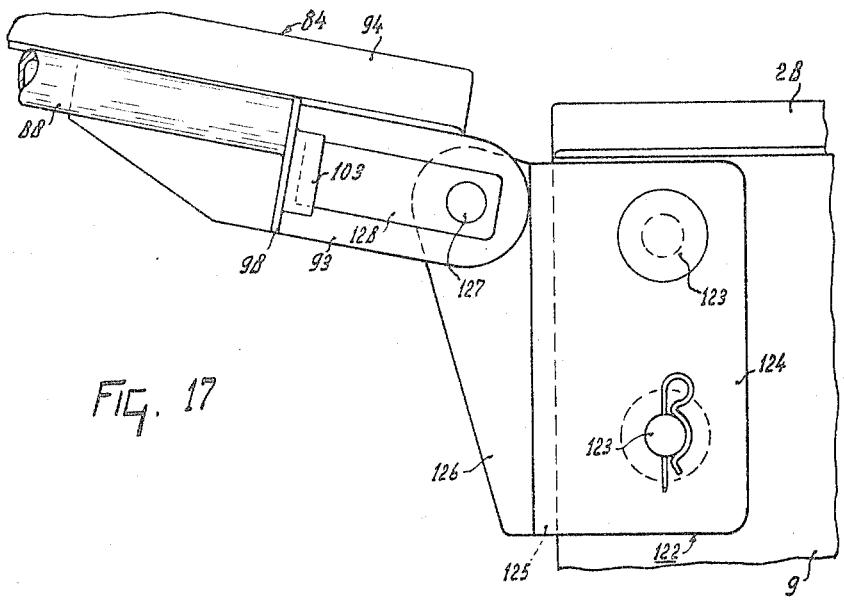
FIG. 17 shows the coupling of a bridge part with a foundation beam.

The parts 83 and 84 are shaped in the same form and one of these parts is shown in detail in FIGS. 13 and 14. A bridge part comprises two closely adjacent, parallel beams 87 and 88. At a given distance from these beams provision is made for a beam 89, which is parallel to the beams 87 and 88 and, viewed from above, located at the center between these beams. On the facing sides of the beams 87 and 88, near the ends provision is made for plates 90, 91, 92 and 93. On the top sides of the beams 87 and 88 a beam 94, formed by an angle iron, is provided (FIGS. 15 to 17). The ends 95 and 96 of the beam 89 are bent over through an angle of about 45° in a direction towards the beams 87 and 88 and extend between the plates 90, 91 and 92, 93 respectively to the lower side of the beam 94.

The beams 87 and 88, which are formed in this embodiment, by hollow pipes (FIG. 16), are closed at their ends by plates 97 and 98 respectively (see FIG. 16), which are at right angles to the plates 90 to 93 and are secured with these plates to the beam 94. Between the beams 87 and 88 and the beam 89 provision is made of beams 99, at right angles to the beams 87 to 89 and beams 100, arranged at an angle to the said beams, so that together these beams constitute a framework. The ends of the beams 99 and 100, located near the beams 87 and 88, are located in between the beams 87 and 88. The beams 99 and 100 are also formed by hollow pipes, whereas the beam 89 is formed by a solid rod. The parts of the rod 89, located between the plates 90 to 93 are flattened. The various parts of this bridge part are welded to each other.

Each bridge part has furthermore two ears 101 and 102, provided with holes. Into these holes are inserted the ends of the coupling bars 85 and 86. The plates 98, secured to the ends of the beam 88 are furthermore provided with safety plates 103, which comprise a portion extending at a given distance from and parallel to the plates 91 and 93, respectively, and a part arranged at right angles thereto.

The parts 83 and 84 of the bridge structure may be coupled with supports 104 (see FIG. 2), adjustable in a direction of height. These supports comprise a housing 104A, which accommodates a vertical shaft 105. The shaft 105 is adjustable in a direction of height and is fixable in a plurality of positions. To the end of the shaft 105 is secured a vertical plate 106. The plates 90 and 91 or 92 and 93 provided on the bridge parts can be arranged on either side of the plate 106, after which a pin can be inserted into the holes 107 and 108 (see FIG. 13) provided in the plates 90 and 91 or 92, and 93 respectively, and into a hole in the plate 106. The bridge parts are connected with the supports 104 so as to be pivotable about horizontal shafts.

After the foundation beams 7 to 9 are arranged at their places, the tractor is coupled by means of the two coupling members with the outer foundation beams 7 and 9 with the aid of the bracket 75 (FIG. 12).

To this end a fastening member 109 is provided on the foundation beam by means of pins 110, which are taken through holes in the coupling member and holes 111 in the foundation beam (see FIG. 1). The coupling member 109 comprises two plates 112, which engage the oblique sides 113 and 114 of the foundation beams (see FIG. 1). The plates 112 are connected with each other by a plate 115, which engages the front side 116 of the foundation beam. The pins 110 are secured against axial displacement by providing them at one end with a head 117, whereas the other end is provided with a hole through which a resilient safety pin 118 is taken.

To the plate 115 is secured a vertical plate 119, which is at right angles to the front side 116 of the foundation beam. The bracket 75 can be coupled with the plate 119 by means of a pin 120, which is taken through holes provided in the bracket 75 and in the plate 119.

The pin 120 can be secured against axial displacement by means of resilient safety pins 121, which are taken through holes provided in the ends of the pin located each on one side of the bracket. Since the resilient pins 118 and 121 can be readily disengaged, the tractor can be connected rapidly and easily with the building.

When the tractor is arranged on one side of the building, the bridge is disposed on the other side. The bridge parts 83 and 84 bear at one end on the supports 104, whereas the other ends are coupled with the foundation beams 7 and 9.

The fastening of the bridge parts to the foundation beams of the building is illustrated in FIG. 17 in detail for the bridge part 84 and the foundation beam 9.

The foundation beam is provided with fastening members 122 with the aid of pins 123 in the manner described above for the fastening members 109. The fastening member 122, like the fastening member 109, comprises two plates 124, extending each on one side of the foundation beam and connected with each other by a plate 125, engaging the front side of the foundation beam.

The plates 124 are provided with holes corresponding with the holes 111 provided at the ends of the foundation beams (see FIG. 1), so that the pins 123 can be taken through these corresponding holes.

To the plate 125 is secured a vertical plate 126, which is at right angles to the plate 125.

The plates 92 and 93, provided at the ends of the bridge part 84 are located each on one side of the plate 126 and a pin 127 is taken through the holes provided in the said plates.

To the pin 127 is secured an arm 128. After the pin 127 has been inserted into the holes, the arm 128 is located between the plate 93 and the safety plate 103, so that the pin is secured against release from the holes in the plates, while at the same time the arm 128 is prevented from turning downwards.

The bridge part 83 is coupled with the beam 7 in a similar manner. When the bridge parts are arranged in a position suitable for assembling the elements, they are located at least substantially parallel to a vertical plane.

Figure 18:
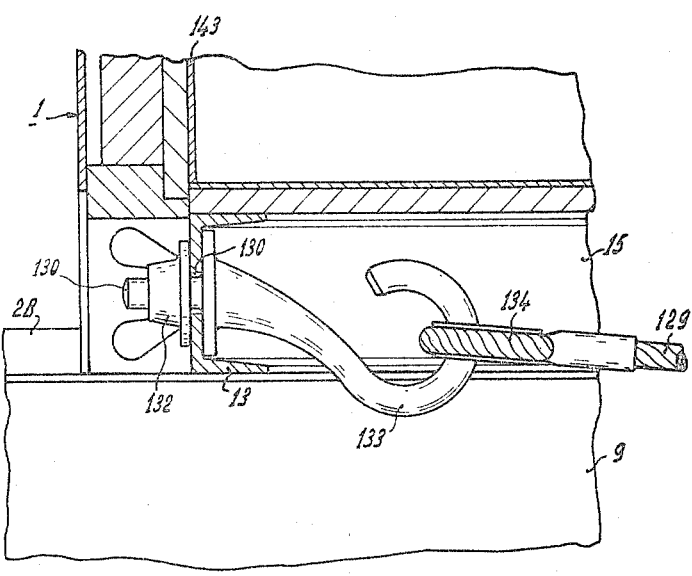
FIG. 18 shows the coupling of a cable with a cellular element.

The elements are supplied by a transporting vehicle, for example a truck 135. The truck is arranged at the side of the bridge structure (FIGS. 2 to 5). Flexible hauling members consisting of the cables 129, co-operating with the winches, are taken underneath the element and secured to the side of the element remote from the tractor, where the beam constitutes the long rectangular side of the element. These beams are provided with holes 130, through which bolts can be taken in order to connect the elements with each other subsequent to their correct disposition in the building (FIG. 18). Into one of these holes, preferably near the side of the element is screwed the screw-threaded end of a bolt 131, which is subsequently secured to the beam with the aid of a wing nut 132. The bolt 131 is integral with a hook 133. The end of the cable 129 is provided with a loop 134, which can be arranged around the hook. The cables extend from the winches on the rear side of the tractor towards the front side of the tractor, where they are guided over guide members formed by the pulleys 81, from which the cables extend between the beams 65 and 66 of the coupling members 64 to the pulleys 82. The pulleys 82 constitute guide members for the cables 129, these cables extending from these pulleys parallel to and along the facing sides of the foundation beams 7 and 9 towards the other side of the building.

By actuating the winches the cellular element can be shifted from the truck onto the bridge structure and from there onto the foundation beams, while the cables are displaced in their direction of length.

The elements are displaced in this way transversely to the longitudinal axis of the truck and parallel to their short rectangular sides.

The angle irons 94, 27 and 28 provided on the two bridge parts 83 and 84 and on the foundation beams 7 and 9, respectively, serve as guide members for the box-shaped element. On the charging floor of the transport vehicle provision is preferably made of similar guide members.

After the first element has been disposed at its place, the cables are disengaged from this element and connected with the next-following element supplied by the transport vehicle, which element in turn is shifted by means of the winches to its place in the building.

From the figures it will be seen that the elements are drawn tightly against each other. The disposed elements are secured to each other with the aid of bolts. The connection and the disconnection of the cables with the elements is a simple operation, since, viewed in the direction of displacement of the elements, the cables are coupled on the rear sides of the elements. After the elements of the lower story have been arranged at their places, the coupling members 64 are connected with the top side of the element 1, whereas the bridge is connected at one end with the top side of the element 3.

The fastening of the coupling members 64 to the top side of the cellular element 1 of the lower story is shown in detail in FIGS. 10 and 11. For coupling of the coupling members of the element 1 the vertical pipes 18 and 19 are provided with fastening members formed by ears 136 and 137 (FIG. 1). These ears are formed by vertical plates, extending at right-angles to the long rectangular sides of the element. The ears are furthermore supported from the angle irons 24 and 25, which project beyond the beams 18 and 19. The ears 136 and 137 are provided with holes 138 and 139.

A bracket 75 can be coupled with an ear 136 or 137 by means of the pin 120, which is taken through the holes in the bracket and in the ears. Neither in the case in which the bracket 75 is coupled with the plate 119, nor in the case in which the bracket 75 is coupled with either of the plates 136 or 137, can thereafter: the bracket 75 turn about the pin 120. This turn is prevented in that the bracket portion between the two parallel limbs of the bracket engages over a given length the plate 119, 136 or 137. The fastening of the bridge to the top side of the box-shaped element 3 of the lower story is shown for the part 84 in FIGS. 15 and 16. The various parts of the elements 3 and 6 have the same reference numerals as the corresponding parts of the elements 1 and 4. In this case the bridge parts are coupled by means of the pins 127 with plates 140, which are shaped in the same form and are fastened in the same manner to the frame of the element 3 as the plates 136 and 137, to which the coupling members 64 are secured.

The cables are guided over the top sides of the elements of the lower story and connected with the rear side of an element standing on the truck and associated with the second story. Now the elements are shifted from the truck over and across the bridge structure and the top sides of the elements of the lower story to their places in the building (FIG. 4). The beams 24 and 25, over which the elements of this story are shifted, serve as guide members for these elements. Since the two winches can be actuated independently of each other, one of the two winches may be stopped if the box-shaped element occupies a slanting position, so that the element can be restored to its correct position.

From FIGS. 10, 11, 15 and 16 it will furthermore be seen that the walls, the ceilings and the floors have already been fastened to the frame of the elements before the latter are disposed in the building. The beam 22 of the frame of the element 1 is provided, for example, with a beam 141, to which wall elements 142 and 143 are secured.

Between the beams 22 and 23 girders 144 are provided, to which the ceiling 145 is secured. Between the beams 30 and 32 of the element 4 provision is made of supporting beams 146, on which bears a floor 147.

To the beam 30 is furthermore secured a beam 148 with the aid of bolts 149. To this beam are secured various wall elements of the outer side of the element 4.

It will be obvious, however, that for example first the naked frames of the elements may be arranged at their places, and that subsequently the floors, ceilings and the like may be provided.

Since in the elements of the lower story the beams 24 and 25 supporting the elements of the top story are located on a higher level than the beams to which the ceiling of the lower story is suspended, the cables 129 may be guided in between the ceiling of the lower story and the lower side of the element of the upper story.

The tractor and the bridge constitute simple and readily displaceable expedients by means of which the building can be assembled. These expedients all have a lower level than the top sides of the cellular elements of the lower story.

Owing to their construction the bridge parts 83 and 84, described above, are strong without being heavy, so that they can be readily displaced.

Since the supports 104 are adjustable in a direction of height, the level of the bridge can be adjusted to compensate for the difference in height between the floor of the vehicle and the place of the element in the building.

The coupling members 64 constitute a structure which transfers the forces exerted on the winches 47 and 48, at least for the major part, to the building operation.

When the elements of the lower story are arranged at their places, it is advantageous to connect the coupling members 64 on one side of the foundation beams with the ends of these beams, whereas the bridge structure is connected with the other ends of the beams. In carrying out the method described above, the simple and cheap expedients permit of arranging the elements at their places in the building.

From FIGS. 7 and 8 it is furthermore evident that to the rear shaft 150 of the tractor are secured two beams 151, the ends of which are provided with U-shaped brackets 152. The coupling bars can then be turned so that they bear in these brackets and hence are parallel to the longitudinal axis of the tractor. The cable 129 can be displaced by winches along the pulleys, so that, when the coupling members occupy these positions, the tractor is capable of lifting material from the ground.

FIGS. 19 to 21 show diagrammatically various phases of the assembly of a building from prefabricated, box-shaped elements, where partly different expedients are employed than those of the preceding embodiment.

In this case a tractor 153 is employed, which is provided on the rear side with two power-take-off shafts extending in opposite directions and at least substantially at right angles to the longitudinal axis of the tractor. Intermediate shafts 154 and 155 are coupled with the said shafts.

To the foundation beams 7 and 9, supporting the sides of the box-shaped elements of the lower story, are secured masts 156 and 157 respectively.

FIGS. 22 to 24 show in detail the mast 156. This mast comprises two upright beams 158 and 159, which are connected with each other at the bottom end by a U-shaped, horizontal beam 160. The U-shaped part 160 is secured to a fastening member 161, which comprises two plates 162, which engage each one sloping side of the foundation beam and are connected with each other by a plate 163, engaging the front side of the foundation beam. The fastening member is secured to the foundation beam by means of pins 164, which are taken through holes in the fastening member 158 and through holes 111 of the foundation beam (FIG. 1).

The connection between the beams 158 and 159 and the fastening member 161 is, in addition, stiffened by struts 165.

Bearings 166 are arranged at the ends of the beams 158 and 159 near the beam 160, a shaft 167 being adapted to rotate therein. To the shaft 167 is secured a cable drum 168. The end of the shaft 167 can be connected with the aid of a universal joint 169 with the intermediate shaft 154. A guide member formed by a pulley 170 is freely rotatable on the shaft 167 for guiding the cable 171, wound around the drum.

The connection between the beams 158 and 159 is further stiffened by struts 172. To the free ends of the beams 158 and 159 are fastened bearings 173 for accommodating a shaft 174. A guide member formed by a pulley 175 for the cable 171 is freely rotatable about the shaft 174. The ends of the beams 158 and 159 are furthermore provided with a support 176, which, when the mast is secured to the foundation beam bears on the top side of the lower element at the level of the beam 22, when this element is arranged at its place in the building.

The mast 157 is constructed in a manner similar to that of the mast 156. Near the foot of the mast provision is made of a cable drum 177, which can be driven by the intermediate shaft 155.

The transport vehicle for supplying the elements and the bridge for bridging the differences in height between the floor of the truck and the place to be occupied by the elements in the building are identical to the transport vehicle and the bridge described with reference to the preceding embodiment. They are therefore designated by the same reference numerals.

The building is assembled as follows.

After the foundation beams 7 to 9 have been arranged in place, the masts 156 and 157 are secured to the foundation beams 7 and 9 respectively and the bridge is arranged as is illustrated in FIG. 19.

Then the truck is maneuvered with the first element of the lower story at the side of the bridge.

For shifting the elements of the lower story to their places the cable 171 is guided from the drum 168 over the pulley 175 and the pulley 170, as is shown in FIG. 24.

From the pulley 170 the cable 171 extends parallel to and along the inner side of the foundation beam 7 towards the transport vehicle. The cable co-operating with the drum journalled in the mast 157 is guided in a similar manner over pulleys journalled in the mast 157 and along the inner side of the foundation beam 9. The cables are coupled again with the rear side of the element as is described with reference to the preceding embodiment. By rotating the winches formed by the cable drums 168 and 177 with the shafts by means of which they are journalled in the mast via the power-take-off shafts of the tractor, the cables 171 are displaced in their longitudinal direction and the element is shifted from the truck across the bridge structure and the foundation beams to its place in the building. The power-take-off shafts are preferably driven independently of each other so that the winches can be actuated individually. This permits of steering to some extent the box-shaped element, if it tends to occupy a slanting position.

After the box-shaped elements of the lower story have been arranged at their places in the building, the cables are guided from the pulleys at the top ends of the masts 156 and 157 directly over the top sides of the elements of the lower story in order to arrange the elements on the lower story. The slip bridge is connected in this case with the top sides of the element 3 of the lower story disposed last, which is illustrated in FIG. 20. Then the elements can be shifted from the truck over the bridge and the top sides of the lower elements to their places in the building.

Also in this case the mounting of the building requires only simple expedients such as the tractor 153, the masts 156 and 157 and the slip bridge formed by the parts 83 and 84. The various expedients have a light weight, they are readily displaceable and can be mounted rapidly. They do not project above the lower elements of the building.

The winches by means of which the elements are drawn to their places in the building are directly fastened to the foundation beams, so that the forces exerted on the winches are absorbed by the building and no separate anchorage of the winches is required.

An advantageous arrangement is obtained by connecting the bridge with one end of the foundation beams, whereas the winches are secured to the other ends of the beams.

FIG. 25 shows diagrammatically how the box-shaped elements of a building can be disposed, if the building is accessible only on one side, for example, if the building is erected alongside a ditch or on a slope, as in the embodiment shown.

In the embodiment shown the foundation beams 178 bear at one end on the slope, whereas the other end of each foundation beam is supported from poles 179, bearing on a beam 180. Also in this case the foundation beams on which bear the sides of the box-shaped elements are provided with guide members formed by angle irons 181. The ends of the two foundation beams lying on the sides of the elements and bearing on the slope are provided with a fastening member 182, similar to the fastening member 122 (FIG. 17), by means of which a bridge 83, similar to bridge 83 of the first embodiment, can be coupled with the foundation beams.

Near the same ends of the aforesaid foundation beams the sides of the beams are provided with U-shaped supports 183, with the aid of pins 184, which are attached to the supports 183 and taken through holes in the foundation beams 178. On the other side of the beam provision is made of a plate 185, through which the pins 184 are taken and which is engaged by the resilient locking pins 186, taken through the said pins. The U-shaped bracket accommodates a winch 187, formed by a drum which is rotatable about a vertical shaft 188. The drum 187 comprises an incorporated electric motor for driving the drum and through the wire 189 current can be supplied to the motor (FIG. 27). A cable 190 is connected with the drum.

At the other end of the foundation beam provision is made of a U-shaped bracket 191, the limbs 192 of which engage the sides of the foundation beam, whereas the intermediate piece 193 between the said limbs engages the rear side of the foundation beam. The U-shaped bracket is secured to the foundation beam with the aid of pins 194. The pins 194 are secured against displacement by means of resilient locking pins 195. With the aid of tags 196 the bracket has secured to it two bearings 197 and 198. The center lines of the bores 199 and 200, respectively, in the bearings 197 and 198, respectively, are located in a vertical plane. The center line of the bore 199 is vertical and the center line of the bore 200 is at a small angle to the horizontal. In one of the bearings a shaft 201 may be journalled at will. A pulley 202 is freely rotatable about the shaft 201. The pulley 202 is enclosed between rings 203 and 204, arranged on the shaft. The ring 204 is secured to the shaft by means of a pin 205. The shaft can be secured against displacement in the bearing by means of a resilient locking pin 206.

For shifting the box-shaped elements 207 to their places in the building, which elements may correspond at least substantially with the elements shown in FIG. 1, the shaft 201 is inserted into the vertical bearing, so that the pulley 202 has a horizontal position. The cable is guided from the winch over the pulley 202, located at the rear end of the foundation beam and from there along the inner side of the foundation beam, underneath any elements already mounted on the foundation beams towards the rear side of the element on the truck, with which it is connected in the manner described above. Also in this case the element is connected at two points with the expedients formed by the winches by means of which the elements can be displaced. By actuating the electric motors incorporated in the winches, the element can be displaced from the truck over the bridge and over the foundation beams to its place in the building, the cables being thus displaced in their longitudinal direction. If a second group of elements is to be arranged on the elements bearing on the foundation beams, the shaft 201 of the pulley 202 on the rear side of the foundation beam can be inserted into the oblique bearing 198, while a further pulley is fastened to the top side of the hindmost element, which pulley is rotatable about a shaft extending parallel to the center line of the bore 200 in the bearing 198. Owing to the oblique position of the pulleys it is ensured that the cable extends over the elements of the lower story inside the side walls.

The bridge structure can be coupled with the top side of the foremost element and the cable can again be guided to the truck, so that the elements of the top story can be shifted by means of the winches over the bridge and the elements of the lower story to their places.

Also in this case, as in the preceding cases, the assembly of the building requires only simple and readily displaceable expedients, which occupy little space.

If the electric motors can be actuated independently of each other, the position of the element during its shift can be acted upon. When the elements are displaced the foundation beam is advantageously loaded, since at one end the slip bridge is coupled with the foundation beams 178 and the cables are guided over pulleys which are fastened at the other ends of the foundation beams.

In assembling buildings by using the method according to the invention use may successfully be made of a lifting bridge. This will be described more fully with reference to FIGS. 30 to 32. From these figures it will be seen that on one side of the foundation beams provision is made of winches 208, each provided with an incorporated electric motor. The winches are provided with fastening members corresponding to the fastening members 122, by means of which they are secured to the foundation beams.

On the other sides of the foundation beams provision is made of a lift bridge. This bridge comprises two lifting towers 209 and 210. Each tower comprises two vertical columns 211 and 212, which are connected with each other by struts 213. The columns bear on beams 214, which are connected with each other by beams 215. The connection between the columns and the beams is stiffened by struts 216, which are connected at one end with the columns and at the other end with the beams 214. The struts 216 are furthermore coupled with the columns by bars 217.

On the columns 211 and 212 of each tower bears a beam 218, on which an electric motor 219 is arranged, by means of which two winches comprising drums 220 and 221 can be driven.

Between the columns is arranged a square frame of beams 222 and 223. To the ends of the beams 222, extending between the two lifting towers are fastened ears 224, which engage the sides of the columns 211 and 212.

The ends of the cables 225, wound around the winch drums, are coupled with the beams 223. The frame constitutes a bridge part, adapted to be displaced by means of the winches 220 and 221 in a direction of height. On the bridge part are provided angle irons 226. A box-shaped element carried to the building site by a truck can be shifted onto the displaceable bridge part by means of the winches 208, fastened to the foundation beams 7 and 9, if the bridge part is moved to the level of the floor of the truck. To this end the cables 227 co-operating with the winches are connected with the element in the manner described above (FIG. 18). When the elements are displaced, the angle irons 226 serve as guides for the cellular element.

When the element stands on the bridge part displaceable in a direction of height, this bridge part can be lowered, whereupon the elements can be drawn by means of the winches from this bridge part onto the foundation. When the elements 1 to 3 of the lower story are disposed, guide members, for example pulleys 228 can be provided on the top side of the element located near the winches 208, fastened to the foundation beams, the cables being guided over the said pulleys in order to shift the elements of a story to their places over the elements of the lower story.

In order to draw the elements of a top story from the truck onto the vertically displaceable bridge part, guide members, for example pulleys can be arranged for guiding the cable on the vertically displaceable bridge part, so that the cable is effectively guided by these pulleys. These guide members are preferably arranged on the bridge part so as to be readily removable, so that they can be taken away, when the vertically displaceable bridge part with the element have arrived at the desired level and before the element is shifted from the bridge part to its place in the building.

From the FIGS. 30 and 31 it will furthermore be seen that between the lifting bridge and the building and between the wheels of the truck and the lifting bridge provision is made of spacing blocks 227. These blocks are provided in order to avoid that the truck or the lifting bridge or both slip during the displacement of the elements, if they are standing on slippery ground.

Also in this case the building can be assembled with the aid of simple expedients, which do not project above the elements of the lower story.

The elements are coupled at two points with the expedients by means of which they are displaced. If the two electric motors 208 can be actuated independently of each other, the position of the element during the displacement can be controlled.

Although in the foregoing reference is always made to cables, use may, of course, also be made of chains. Moreover, other tools may be employed for displacing the cables or chains than the winches with rotatable drums, as shown herein.

It will furthermore be obvious that the method, according to the invention, may be used not only with buildings of the kind shown in the figures, but also with differently assembled buildings, for example buildings in which a plurality of elements engage each other with their short rectangular sides.

Having described my invention, what I claim as new and desire to cover by Letters Patent of the United States is:

1. An improvement in the method of assembling buildings from prefabricated box-shaped elements each having dimensions compatible with being transported on highways by transport vehicles, which comprises transporting one of said box-shaped elements by transport vehicle alongside the site of said building, placing foundation beams on said site, locating the bed of said transport vehicle higher than said foundation beams, positioning a bridge member having a length greater than the width of said element between the side of said transport vehicle and said site so that said bridge member is supported on one end by said beams and is inclined downwardly towards said beams, connecting a flexible hauling means to said element, pulling said element by said hauling means sidewise off of said transport vehicle and across said bridge member and said foundation beams until said element is disposed in its desired position on said site, said bridge member and foundation beams having operatively related guidance means including upstanding portions extending above said bridge member and foundation beams, said guidance means retaining said element in a predetermined angular relationship as said element is pulled across said bridge member and said foundation beams, and repeating the foregoing operation with at least one further of said box-shaped elements, the latter being pulled to a location adjacent said first-mentioned element and secured thereto.

2. In a method in accordance with claim 1, the use of a tractor which includes a winch driven by the engine of said tractor and a pair of coupling means, said coupling means spaced from each other a distance about equal to the length of said element, said flexible hauling means including two parallel portions, said portions being connected to said element and guided by said coupling means to said winch.

3. An improvement in the method of assembling buildings from prefabricated box-shaped elements each having dimensions compatible for being transported on highways by transport vehicles which comprises positioning a plurality of said elements to make up one story at a building site, said elements so positioned having parallel guide means including upstanding portions extending above said elements on their upper sides, transporting a further of said elements by transport vehicle alongside said plurality of elements, positioning a bridge member between said transport vehicle and said plurality of elements, whereby said bridge member is supported on one side by said plurality of elements, said bridge member having guidance means operatively related to said parallel guide means, said guidance member also including upstanding portions extending above said bridge member, connecting a flexible hauling means to said further element, pulling said further element by said hauling means off said transport vehicle and across said bridge member onto the upper sides of said plurality of elements until said further element is disposed at its desired position on said plurality of elements, said guidance means and said guide means guiding said further element and retaining said element in a predetermined angular relationship as it is pulled across said bridge member and said plurality of elements, and repeating the foregoing operation with at least a still further of said box-shaped elements, the latter being pulled to a location adjacent said first mentioned further element and secured thereto.

4. An improvement in the method of assembling buildings from prefabricated box-shaped elements, each having dimensions compatible for being transported on highways by transport vehicles, which comprises the laying in horizontal parallel relationship of two foundation beams at a building site, transporting one of said box-shaped elements by transport vehicle to said building site, placing said box-shaped element transverse to said beams spaced forward from their forward ends, positioning a pair of parallel elongated bridge members having a length greater than the width of said box-shaped element between said beams and said element so that said bridge members are each supported on one end by said beams, said bridge members being positioned within vertical planes parallel to vertical planes containing said beams, said bridge member and said beams having operatively related guidance means including upstanding portions extending above said bridge members and said beams in said vertical planes, connecting a flexible hauling means to said element, pulling said element firstly sideways off of said transport vehicle and across said bridge members and secondly across said beams until said element is disposed transversely across said beams in its desired position, said guidance means retaining said element in a predetermined transverse position as it is pulled across said bridge members and said beams, and repeating the foregoing operation with at least one further box-shaped element, said latter element being pulled to a location on said beams adjacent said first mentioned element.

References Cited by the Examiner

UNITED STATES PATENTS

| | | | |
|---|---|---|---|
| 1,362,069 | 12/1920 | Witzel. | |
| 1,784,975 | 12/1930 | Rosman | 214—38.8 |
| 1,886,943 | 11/1932 | D'Humy | 214—16.18 |
| 1,933,211 | 10/1933 | Flowers | 214—85.1 |
| 2,096,958 | 10/1937 | Cleric | 214—38.22 |
| 2,245,318 | 6/1941 | Blank | 52—64 |
| 2,296,659 | 9/1942 | Bates | 214—152 |
| 2,337,138 | 12/1943 | Berg | 14—72 |
| 2,396,828 | 3/1946 | Carpenter | 52—92 |
| 2,442,549 | 6/1948 | Pearlman | 214—38.8 |
| 2,581,192 | 1/1952 | La Fleur | 52—201 |
| 2,588,001 | 3/1952 | Holland | 214—505 |
| 2,691,450 | 10/1954 | Rosenbaum | 214—38 |
| 2,712,863 | 7/1955 | Busch. | |
| 2,760,216 | 8/1956 | Curtis | 14—72 |
| 2,775,355 | 12/1956 | Leitner | 214—85 X |
| 2,820,560 | 1/1958 | Davis | 214—38.8 |
| 2,834,574 | 5/1958 | Sentman | 254—166 |
| 2,843,276 | 7/1958 | Copeland | 214—38.8 |
| 2,850,320 | 9/1958 | Grochmal | 52—67 |
| 2,896,273 | 7/1959 | Petter | 52—90 |
| 2,924,829 | 2/1960 | Mosier | 52—65 |
| 2,944,687 | 7/1960 | Segur | 214—152 |
| 3,027,141 | 3/1962 | Ellis | 254—166 |
| 3,040,914 | 6/1962 | Johnson | 214—38.8 |
| 3,044,614 | 7/1962 | Code | 214—152 |

FOREIGN PATENTS

| | | |
|---|---|---|
| 991,685 | 1951 | France. |
| 1,219,928 | 1959 | France. |
| 570,047 | 1933 | Germany. |

OTHER REFERENCES

Architectural Record, February 1943, pages 49, 50, and 51.

Engineering News-Record, February 26, 1959, pages 44 and 54.

Prefabrication, January 1954, page 11.

FRANK L. ABBOTT, *Primary Examiner.*

JACOB L. NACKENOFF, *Examiner.*

J. E. MURTAGH, *Assistant Examiner.*